June 3, 1947.　　　　J. R. HUBER　　　　2,421,620
FUSELAGE SKELETON FOR ROTATIVE WING AIRCRAFT
Filed Aug. 31, 1942　　　3 Sheets-Sheet 3

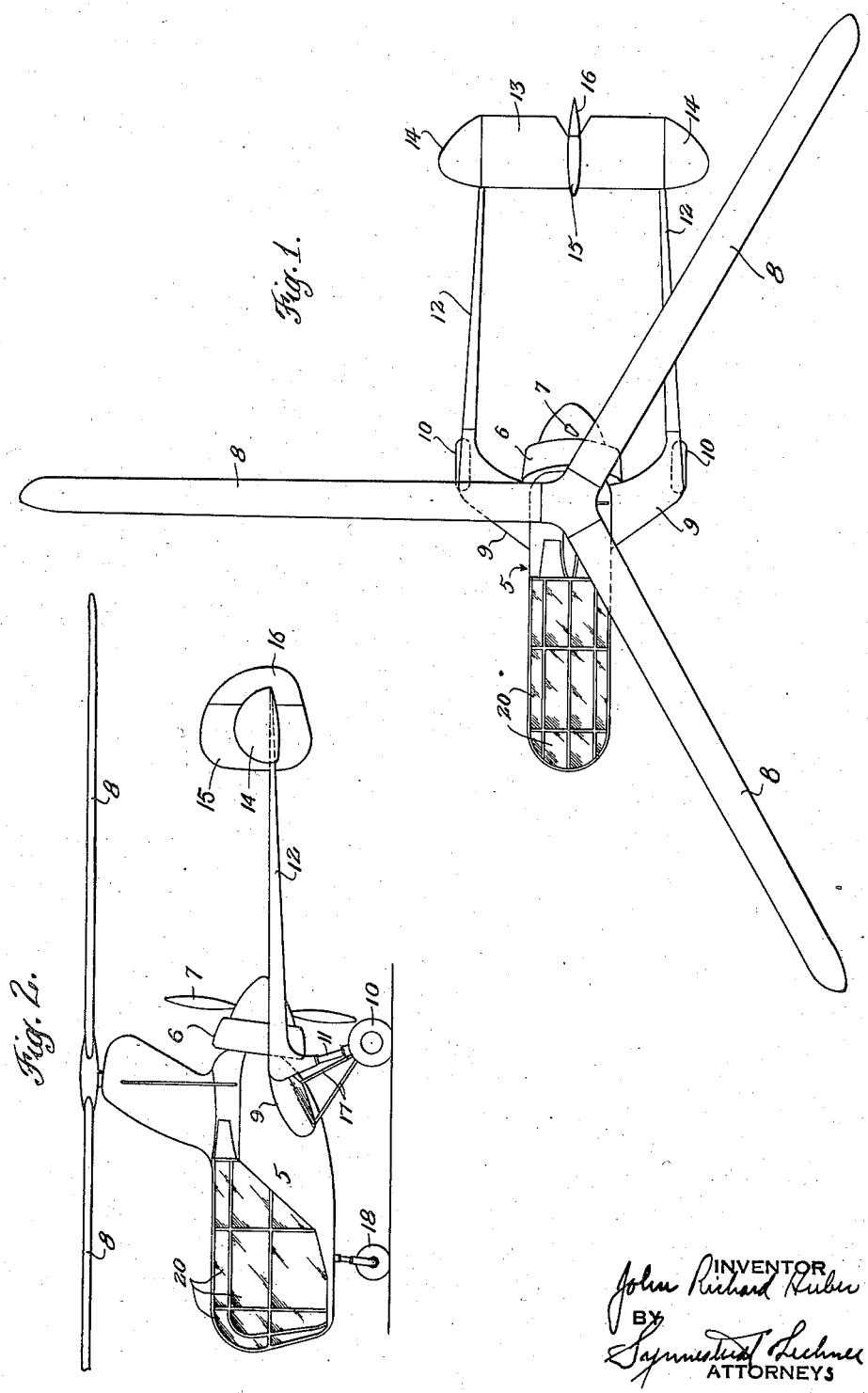

INVENTOR:
John Richard Huber
BY
ATTORNEYS.

Patented June 3, 1947

2,421,620

UNITED STATES PATENT OFFICE 2,421,620

FUSELAGE SKELETON FOR ROTATIVE WING AIRCRAFT

John Richard Huber, Warrington, Pa., assignor to Autogiro Company of America, Philadelphia, Pa., a corporation of Delaware Application August 31, 1942, Serial No. 456,766

3 Claims. (Cl. 244—119)

This invention relates to aircraft and is especially concerned with aircraft of the rotative wing type. Still more particularly, the invention has reference to structural features of such an aircraft, notably features of the fuselage structure.

One of the primary objects of the invention lies in the provision of a novel form of structural skeleton constituting the "backbone" of the fuselage, which skeleton is arranged to provide the necessary and desired strength with a minimum of weight in the structural parts and with a minimum of complication, particularly from the standpoint of fabrication.

While a number of the broader aspects of the invention are of general applicability, many features are particularly adapted to a rotative wing aircraft of the type in which a propulsive engine and air screw is arranged in pusher fashion. In fact, the fuselage skeleton and other structural features of the present invention are especially adapted to the "pusher" type of machine disclosed in copending application of Paul H. Stanley, Serial No. 443,563, filed May 19, 1942, and issued August 6, 1946, as Patent No. 2,405,244.

As disclosed in the copending application just mentioned, the type of aircraft to which the present invention is particularly adapted is provided with a sustaining rotor mounted above the fuselage toward the rear end thereof, the fuselage being extended forwardly from the rotor mount and being arranged to accommodate one or more occupants' seats forwardly of the rotor axis location. In that aircraft the pusher engine and air screw are disclosed at the rear of the fuselage, tail surfaces being mounted to the rear of the air screw by means of a pair of tail booms which extend rearwardly from laterally projecting stubs extended from the fuselage structure in the region of the engine mount. Said laterally projecting stubs are additionally employed for mounting of the primary landing wheels.

In accomplishing the foregoing general objects in a machine of the character just mentioned, the invention provides a structural skeleton which is of relatively great depth or vertical dimension in the region in which the rotor, engine and landing gear stubs are connected, the skeleton having a relatively shallow portion projecting forwardly from the relatively deep portion. In accordance with the invention the forward shallow cantilever portion of the skeleton is utilized to support at least one and preferably a pair of occupants' seats arranged in tandem.

The invention also contemplates forward projection of the shallow portion of the skeleton at an elevation appreciably below the mean horizontal plane of the rear or deep portion of the skeleton, whereby to maintain the center of gravity as low as possible, which is desirable for reasons which need not be considered in detail herein.

Another feature of the invention is the employment of structural stubs projecting laterally from the deep portion of the skeleton in order to carry not only the primary landing wheels but also the booms employed for mounting the tail. In the preferred construction these structural stubs comprise the projecting end portions of a transverse structural beam which extends beneath the fuselage skeleton. The transverse beam and the skeleton are interconnected and serve to interbrace each other.

Still another object is the arrangement of the transverse beam above mentioned (having its ends projecting laterally to constitute landing wheel stubs) in a manner providing for convenient attachment and separation thereof as a unit, whereby, in the event of damage, the entire landing gear structure may be removed and replaced as a unit.

How the foregoing and other objects and advantages are attained will appear more fully from the following description referring to the accompanying drawings in which—

Figure 1 is a top plan view of an aircraft of the type to which the invention is particularly adapted;

Figure 2 is a side elevational view of the aircraft of Figure 1;

Figure 3:
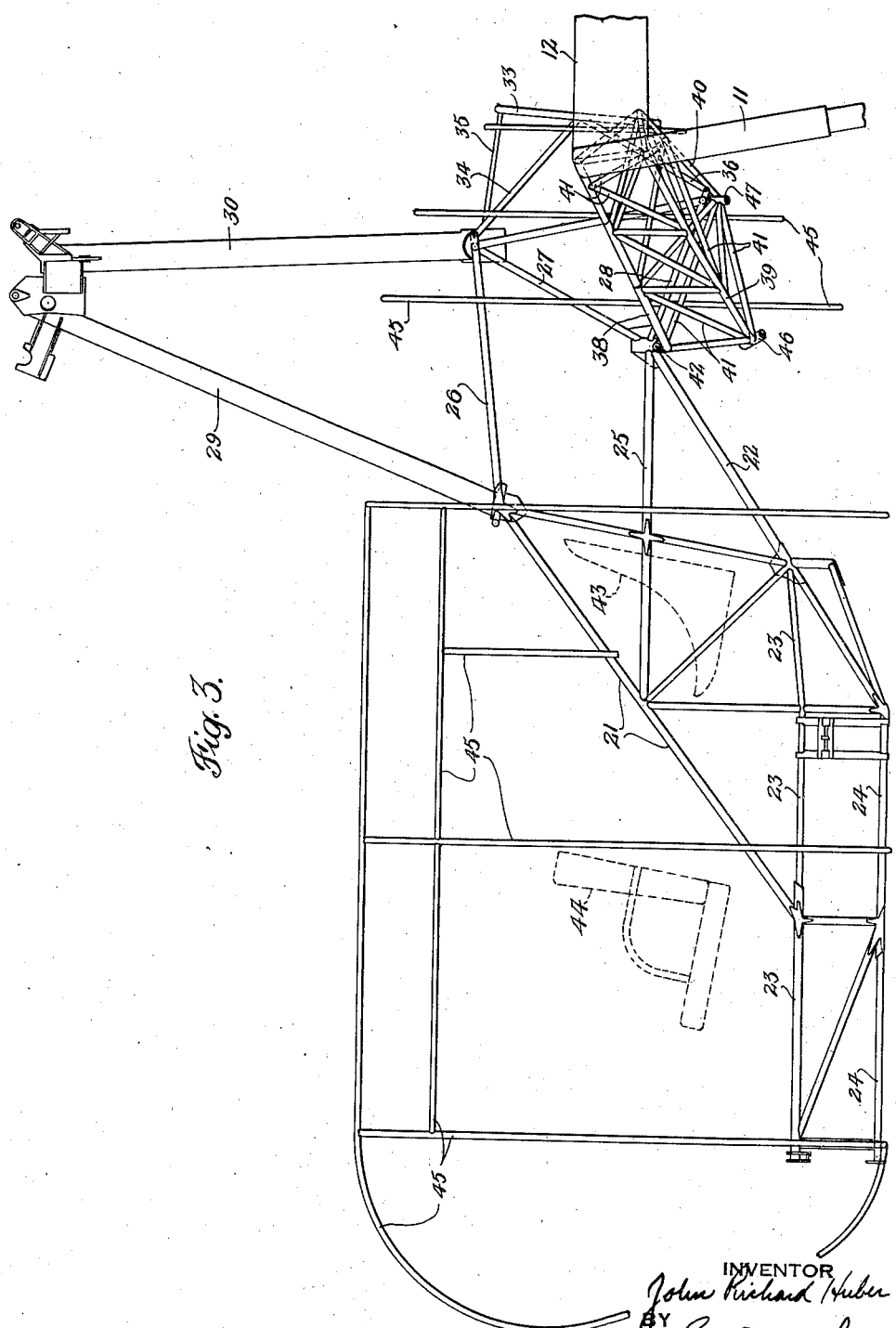
Figure 3 is an enlarged side elevational view of the fuselage skeleton and associated structural parts.

Referring first to Figures 1 and 2, the fuselage 5 is of relatively short construction, the propulsive engine being enclosed at 6 at the rear of the fuselage and serving to drive the pusher air screw 7.

The blades of the sustaining rotor are indicated at 8, three being here shown, although the rotor may incorporate any desired number of blades. Preferably the individual rotor blades are pivotally connected with a common hub, the pivots including at least a "flapping" pivot, and preferably also a "drag" pivot, so as to provide freedom for swinging movement of the blades in directions transverse and within the mean rotative path of travel of the blades.

The rotor may be normally driven in flight, as in a helicopter, or may be freely rotative in normal flight. In either event the drive mechanism is preferably arranged to deliver power from the engine to the rotor, in the case of a helicopter to normally provide the rotor driving force, and in the case of a freely rotative rotor, to provide for initiating rotation of the rotor prior to take-off from the ground. The details of such drive mechanism need not be considered herein although it should be noted that the drive preferably includes at least a manual clutch and preferably also an over-running clutch, so as to permit free rotation of the rotor by "auto-rotation." In the case of a helicopter, this free "autorotation" may serve to permit descent without power.

Appropriate rotor controls, for instance, controls providing for maneuvering of the aircraft are desirably employed in a machine of this general type, but these features need not be considered in detail herein since they form no part of the invention per se.

As clearly appears in Figures 1 and 2, the rotor is mounted above the body or fuselage, toward the rear end thereof, a rotor mount for this purpose being described more fully hereinafter. At a point below the rotor a pair of laterally projecting stubs 9—9, are arranged, these stubs serving to support primary landing wheels 10—10, as by means of shock struts 11. The stubs further support booms 12—12 which extend rearwardly therefrom to carry the surfaces of the tail, which surfaces desirably incorporate a horizontal surface 13, a pair of dihedral tips 14—14, a vertical surface 15, and a rudder 16. Rudder controls, such as cables, may be conveniently carried forward through the booms 12—12, these booms being of hollow tubular construction as is disclosed in the copending application above referred to.

A V strut 17—17 may be associated with each landing wheel, the inner and upper ends of the members 17 being connected to structural parts described hereinafter.

Below the forward portion of the body another wheel 18 is employed, so as to provide an appropriate position of rest on the ground.

The enclosure of the forward portion of the fuselage is preferably effected by means of transparent windows such as indicated at 20, these windows being carried by framing described more fully hereinafter with reference to Figs. 3 and 4.

From the general disposition of the major elements of the machine as described above with reference to Figures 1 and 2, it will at once be seen that the structural and stress problems involved are unusual and require special arrangement of structural parts. With the foregoing in mind the invention contemplates the employment of a fuselage skeleton, i. e., the primary structural "backbone" of the fuselage, which skeleton embodies a number of unique features, including the following.

The skeleton, in general, comprises a rear portion of relatively great vertical dimension or depth, and a forward portion of relatively small vertical dimension, the forward portion projecting in cantilever fashion from the rear portion. Moreover, some of the primary generally longitudinal structural members such as those indicated at 21 and 22 are inclined upwardly and rearwardly, serving to interconnect the forward and rear parts of the skeleton.

It is not believed necessary herein to specifically describe all of the structural elements of the skeleton, since the arrangement of many of them will be plain from the drawings and further since many of them are susceptible of modification without departing from the general pattern of the skeleton contemplated by the invention. However, it is to be noted that the forward cantilever portion of the skeleton includes upper and lower longitudinal members 23 and 24, which are appropriately interbraced and also connect with the inclined primary members 21 and 22.

The inclined members 21 and 22 and also additional longitudinal members such as shown at 25 join still other members 26, 27 and 28 which constitute important elements of the rear relatively deep portion of the skeleton.

Figure 4:
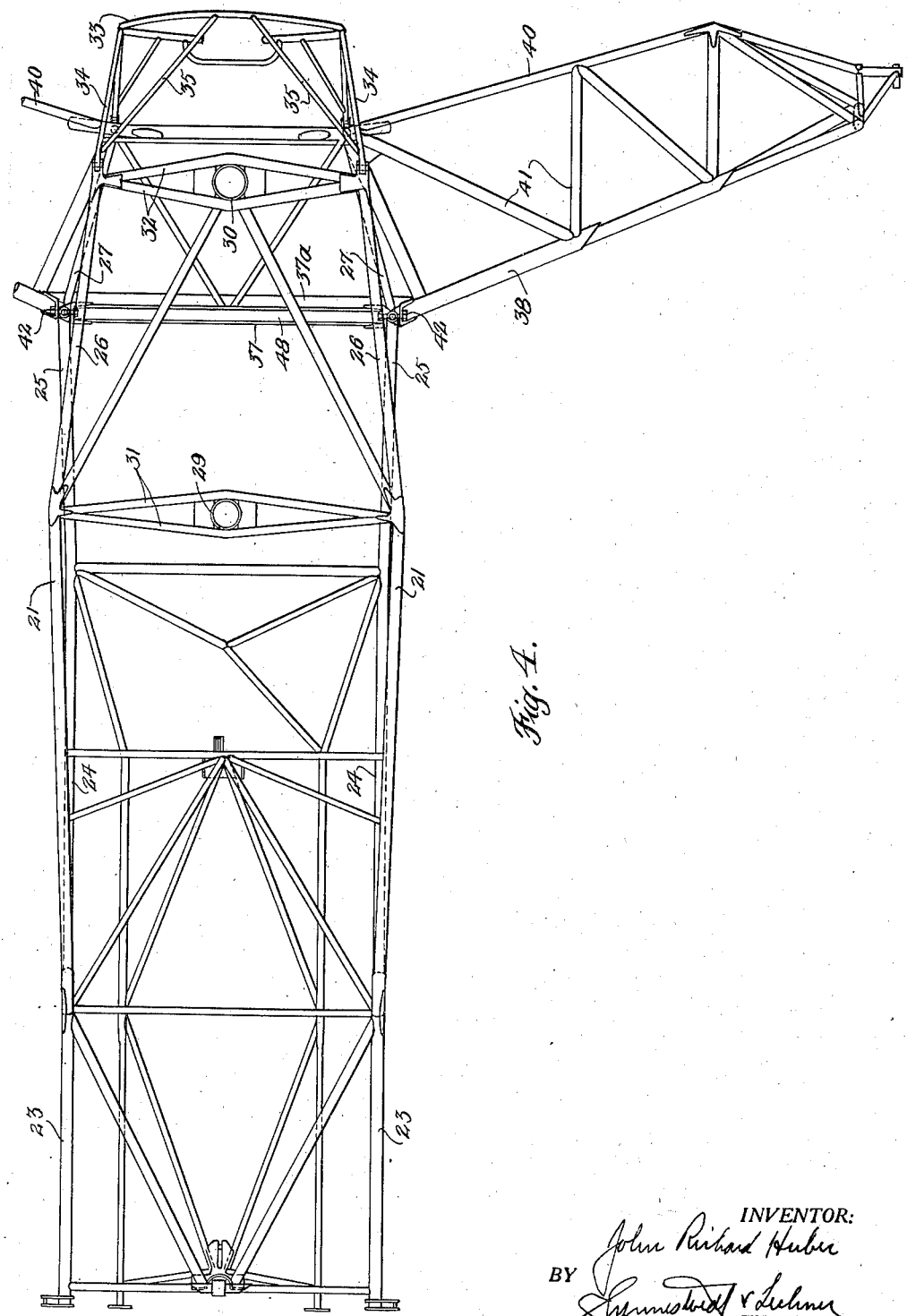
Figure 4 is a fragmentary top plan view of structural parts shown in Figure 3, this view being still further enlarged.

The rotor mount desirably comprises a pair of pylon legs 29 and 30 which, as clearly appears in Figure 4, are received respectively between pairs of transverse members 31—31 and 32—32. The rotor is thus mounted above the rear portion of the fuselage skeleton, being firmly anchored to various of the primary structural elements thereof. With respect to this point it may be further noted that bulkhead bracing is appropriately arranged in various transverse planes, for instance in the region of elements 31—31 and 32—32. The bulkhead bracing is capable of considerable variation and it is not thought necessary to consider the arrangement thereof in detail herein.

For the purpose of mounting the engine, a ring 33 is carried just to the rear of the rear pylon leg 30, the ring being connected with the skeleton, as by means of members indicated at 34, 35 and 36.

As hereinbefore mentioned, a transverse structural beam is employed for the purpose of mounting the primary landing wheels and further for carrying the tail booms. This beam extends transversely below the fuselage skeleton itself generally in the vertical plane containing the rear pylon leg 30. The beam incorporates three primary members, extended transversely of the aircraft, one of which appears at 37 in Fig. 4, just below the transverse brace 48 of the fuselage skeleton. Another of the primary members of the beam also appears in Figure 4 at 37a. The third lies to the rear of the first two, and the three primary members of the beam are arranged in parallelism to define a beam of triangular section, as described more fully herebelow with reference to the projecting or stub ends of the beam.

At each side of the skeleton, the projecting end of the beam incorporates three primary members 38, 39 and 40, the first two being located generally one above the other, and the third to the rear, as clearly appears in Figure 4. Appropriate interbracing, such as shown at 41, interconnects the members 38, 39 and 40. Similar interbracing is employed to interconnect and interbrace the three primary transverse members (two of them appearing at 37 and 37a) which pass beneath the fuselage skeleton and serve to interconnect the projecting stubs or end portions of the beam.

The transverse beam described above is of unitary construction and is desirably secured to the skeleton by removable fasteners of any suitable type, such for instance, as apertured fittings adapted to cooperate with bolts. Pairs of such fittings and bolts are indicated at 42. Preferably the transverse beam is joined to the skeleton not only along the forward edge, but also along the rear edge, i. e., in the region of the primary members 40 of the stubs. By the employment of a pair of joints such as shown at 42 at the forward edge and a similar pair adjacent the rear edge of the beam, the entire landing gear supporting structure may be removed and replaced as a unit, thereby greatly facilitating repair in the event of damage. When the transverse beam is connected, the beam and the skeleton interbrace each other.

As hereinbefore mentioned, the projecting ends of the transverse beam constitute structural stubs for mounting the primary landing wheels and also for mounting the tail structure. Thus, as shown in Figure 3, a shock strut 11 is attached to the outer end of one of the stubs, as is also a tubular boom 12, of the type shown in Figures 1 and 2. The details and manner of mounting or connecting these elements to the stub need not be considered herein.

The members 17 of the V strut for each landing wheel may be connected to fittings such as indicated at 46 and 47 mounted on the transverse beam itself, and therefore removable with the beam and the landing wheels.

For reasons brought out more fully in the copending application above referred to, the stub ends of the transverse beam are extended somewhat upwardly and rearwardly, this configuration being clearly illustrated in all of the figures of the drawings.

From the foregoing it will be seen that for an aircraft of a given size, the essential structure of the fuselage is relatively small, the elements being compactly associated, and distributed in a manner which is highly effective from the standpoint of carrying the loads originating in the rotor, in the tail and in the landing wheels. Although other types of individual structural elements may be used, the construction lends itself well to the welded tube type of construction.

The location of the occupants' seats is indicated in Figure 3, wherein two seats are illustrated in tandem relation. Seat 43 desirably comprises the pilot's seat and seat 44 may be used by an observer. Both of these seats, it will be noted, are mounted above the relatively shallow forward portion of the skeleton which is carried in cantilever, the rear seat 43 being nested between the inclined primary longitudinal members 21, and also between interconnecting and interbracing elements located at each side.

Supplemental structural members of very light weight are mounted on the structural skeleton already described, in order to provide a support for fuselage covering material, including windows such as indicated at 20 in Fig. 1. Supplemental elements for this purpose are designated by the reference numeral 45.

I claim:

1. For an aircraft having a sustaining rotor, a fuselage structure of which the primary structural skeleton is relatively shallow in a forward portion as compared with a rearward portion thereof, structural members of said skeleton toward the top of said rearward portion thereof being arranged for support of a rotor mount, structural members of said rearward portion being arranged for support of an engine, a unitary cantilever beam constituting structure in addition to that of said primary structure of the fuselage and connected with the skeleton in the rear portion thereof in the region of the engine location, and having relatively short stub ends projecting laterally at each side of the skeleton, primary alighting elements for the aircraft connected with the stub ends of said beam adjacent the outer ends thereof, and empennage supporting booms also connected with the stub ends of said beam adjacent the outer ends thereof.

2. A construction in accordance with the preceding claim in which said beam is removably secured to the skeleton.

3. For an aircraft having a sustaining rotor and a pusher type propulsive airscrew, a fuselage structure of which the primary structural skeleton is made up of framing elements to which a rotor mount is adapted to be connected, some of said framing elements to the rear of the rotor axis location being arranged to mount an engine for the propulsive airscrew, some of the primary longitudinal elements of said skeleton being inclined forwardly and downwardly from the zone of attachment of the rotor mount and being arranged to support an occupant's seat disposed forwardly of the rotor axis location, a unitary cantilever beam constituting structure in addition to that of said primary structural skeleton of the fuselage and connected with the skeleton toward the rear thereof, with the ends of the beam projecting laterally at each side of the skeleton to points just beyond the lateral extension of the blade tip path of the pusher airscrew, primary alighting elements for the aircraft connected with said beam adjacent said points, and empennage supporting booms also connected with said beam adjacent said points.

JOHN RICHARD HUBER.

REFERENCES CITED

The following references are of record in the file of this patent:

UNITED STATES PATENTS

| Number | Name | Date |
|---|---|---|
| 1,851,368 | Morse | Mar. 29, 1932 |
| 1,884,599 | Cierva | Oct. 25, 1932 |
| 2,068,618 | Wilford | Jan. 19, 1937 |
| 2,177,499 | Schairer | Oct. 24, 1939 |
| 2,318,260 | Sikorsky | May 4, 1943 |
| 1,816,678 | Hilton | July 28, 1931 |
| 2,211,089 | Berlin | Aug. 13, 1940 |
| 2,150,546 | Flader | Mar. 14, 1939 |
| 2,318,909 | Woods | May 11, 1943 |
| 2,001,260 | Martin | May 14, 1935 |

FOREIGN PATENTS

| Number | Country | Date |
|---|---|---|
| 258,595 | Great Britain | Nov. 10, 1927 |
| 269,898 | Great Britain | Dec. 1, 1927 |
| 318,896 | Great Britain | Sept. 10, 1929 |
| 818,673 | France | June 21, 1937 |

OTHER REFERENCES

Jane's All The World's Aircraft 1938, page 242C.